(12) United States Patent
Laxman et al.

(10) Patent No.: US 10,853,579 B2
(45) Date of Patent: Dec. 1, 2020

(54) MIXED-INITIATIVE DIALOG AUTOMATION WITH GOAL ORIENTATION

(71) Applicants: Srivatsan Laxman, Palo Alto, CA (US); Devang Savita Ram Mohan, Bangalore (IN); Supriya Rao, Palo Alto, CA (US)

(72) Inventors: Srivatsan Laxman, Palo Alto, CA (US); Devang Savita Ram Mohan, Bangalore (IN); Supriya Rao, Palo Alto, CA (US)

( * ) Notice: Subject to any disclaimer, the term of this patent is extended or adjusted under 35 U.S.C. 154(b) by 114 days.

(21) Appl. No.: 16/170,034

(22) Filed: Oct. 25, 2018

(65) Prior Publication Data

US 2020/0134018 A1   Apr. 30, 2020

(51) Int. Cl.
*G06F 40/30* (2020.01)
*G06N 3/08* (2006.01)

(52) U.S. Cl.
CPC ............. *G06F 40/30* (2020.01); *G06N 3/08* (2013.01)

(58) Field of Classification Search
CPC ...................................................... G06F 40/30
See application file for complete search history.

(56) References Cited

U.S. PATENT DOCUMENTS

| | | | | |
|---|---|---|---|---|
| 7,609,829 B2* | 10/2009 | Wang | ................... | H04M 3/4938 |
| | | | | 379/201.01 |
| 8,527,262 B2* | 9/2013 | Kambhatla | ........... | G06F 40/284 |
| | | | | 704/9 |
| 9,424,250 B2* | 8/2016 | Chelst | ................... | G06F 40/131 |
| 2014/0297268 A1* | 10/2014 | Govrin | ..................... | G06N 5/04 |
| | | | | 704/9 |

* cited by examiner

*Primary Examiner* — Matthew H Baker

(57) ABSTRACT

In one aspect, method useful for goal-oriented dialog automation comprising includes the step of receiving an input message. The method includes the step of implementing an entity tagging operation on the input message. The method includes the step of tagging the message context of the input message to generate a tagged message context. The method includes the step of implementing semantic frame extraction from the tagged message context. The method includes the step of implementing an entity interpretation on the extracted frame. The method includes the step of accessing a database to determine a business schedule and a client profile. The business schedule and the client profile are related to the input message. The method includes the step of implementing a retrieval engine. The retrieval engine obtains one or more response templates. The method includes the step of generating a ranked list of candidate templates from the output of the retrieval engine. Based on the output of the entity interpretation, the business schedule and the client profile, and the ranked list of candidate templates, implementing a candidate eliminator. Based on the output of the candidate eliminator, providing a set of recommended responses. Each recommend response is associated with a confidence score.

7 Claims, 14 Drawing Sheets

```xml
<visit intent=[book|modify|cancel|info]>
    <config intent=[requested|proposed|accepted|available|rejected|unavailable|booked|current|cancelled]>
        <location intent=[include|exclude]>
            <city value=[palo alto...]></city>
            <zipcode value=[94304]...]></zipcode>
            <street value=[castro]...]></street>
            <state value=[CA]...]></state>
            <region value=[bay area]...]></region>
        </location>

<time intent=[include|exclude]>
            <year value=[...|2016|2017|2018|...]></year>
            <month value=[jan|feb|mar|apr|may|jun|jul|aug|sep|oct|nov|dec]></month>
            <week value=[1|2|...|52]></week>
            <dayOfMonth value=[1|2|...|31]></dayOfMonth>
            <dayOfWeek value=[mon|tue|wed|thu|fri|sat|sun]></dayOfWeek>
            <hourMinute value=[hourMinute]></hourMinute>
            <amPm value=[am|pm]></amPm>
            <timezone value=[timezone]></timezone>
        </time>

<client>
            <name value=[name]></name>
            <phone value=[phone]></phone>
            <gender value=[male|female]></gender>
            <relationToCaller value=[self|daughter|...]></relationToCaller>
            <ccOnFile value=yes|no]></ccOnFile>
            <staff intent=[include|exclude]>
                <name value=[name]></name>
                <gender value=[male|female]></gender>
                <speciality value=[male|female]></speciality>
            </staff>
            <services intent=[include|exclude]>
                <name value=[service_name]></name>
                <category value=[service_category]></category>
            </services>
        </client>

</config>

</visit>
```

Is George free for a color today ? Oh and my daughter
$\underbrace{\phantom{George}}_{Staff\_Name\ (include)}$ $\underbrace{\phantom{color}}_{Service\_Name(include)}$ $\underbrace{\phantom{today}}_{DayOfWeek\ (include)}$ $\underbrace{\phantom{Oh\ and\ my\ daughter}}_{User\_Relation}$ would like a $\underbrace{trim}_{Service\ (include)}$

Is George free for a color today ? Oh and my
        Visit 1 (Book)  Visit 1 (Book)  Visit 1 (Book)

daughter would like a trim
Visit 1 (Book)            Visit 1 (Book)

Is George free for a color today ? Oh and my daughter would like a trim

Visit 1 (Book)
Config 1 (Requested)

FIGURE 9

| Sentence Labelling | | | | | | |
|---|---|---|---|---|---|---|
| Token | First Pass | Second Pass | Third Pass | Fourth Pass | Fifth Pass | Sixth Pass |
| Is | - | - | - | - | - | - |
| George | Book | - | Config 1 | Client 1 | - | - |
| free | - | - | - | - | - | - |
| for | - | - | - | - | - | - |
| a | - | - | - | - | - | - |
| color | Book | - | Config 1 | Client 1 | - | - |
| today | Book | - | Config 1 | Client 1 | Client 2 | - |
| ? | - | - | - | - | - | - |
| Oh | - | - | - | - | - | - |
| and | - | - | - | - | - | - |
| my | - | - | - | - | - | - |
| daughter | Book | - | Config 1 | - | Client 2 | - |
| would | - | - | - | - | - | - |
| like | - | - | - | - | - | - |
| a | - | - | - | - | - | - |
| trim | Book | - | Config 1 | - | Client 2 | - |

MIXED-INITIATIVE DIALOG AUTOMATION WITH GOAL ORIENTATION

FIELD OF THE INVENTION

This description relates to the field of natural language processing and more specifically to mixed-initiative dialog automation with goal orientation.

DESCRIPTION OF THE RELATED ART

With rapid advancements in machine learning, chatbots have seen a significant rise in popularity. However, most chatbots employ state-based models which are notoriously difficult to scale with. For any truly natural language system, the complexity of the state space quickly becomes difficult to manage and thus hits a barrier in terms of functionality. The universe of possible responses are constantly growing, and the system proposed below is designed to not only scale, but actually thrive on this variety.

SUMMARY

In one aspect, method useful for goal-oriented dialog automation comprising includes the step of receiving an input message. The method includes the step of implementing an entity tagging operation on the input message. The method includes the step of tagging the message context of the input message to generate a tagged message context. The method includes the step of implementing semantic frame extraction from the tagged message context. The method includes the step of implementing an entity interpretation on the extracted frame. The method includes the step of accessing a database to determine a business schedule and a client profile. The business schedule and the client profile are related to the input message. The method includes the step of implementing a retrieval engine. The retrieval engine obtains one or more response templates. The method includes the step of generating a ranked list of candidate templates from the output of the retrieval engine. Based on the output of the entity interpretation, the business schedule and the client profile, and the ranked list of candidate templates, implementing a candidate eliminator. Based on the output of the candidate eliminator, providing a set of recommended responses. Each recommend response is associated with a confidence score.

BRIEF DESCRIPTION OF THE DRAWINGS

FIG. 6 illustrates an example schema for a semantic frame, according to some embodiments.

FIGS. 7-10 illustrate examples of entity tagging and semantic frame extraction, according to some embodiments.

FIG. 11 illustrates an example table of a process of implementing a multi-pass hierarchical sequence framework, according to some embodiments.

Figure 1:
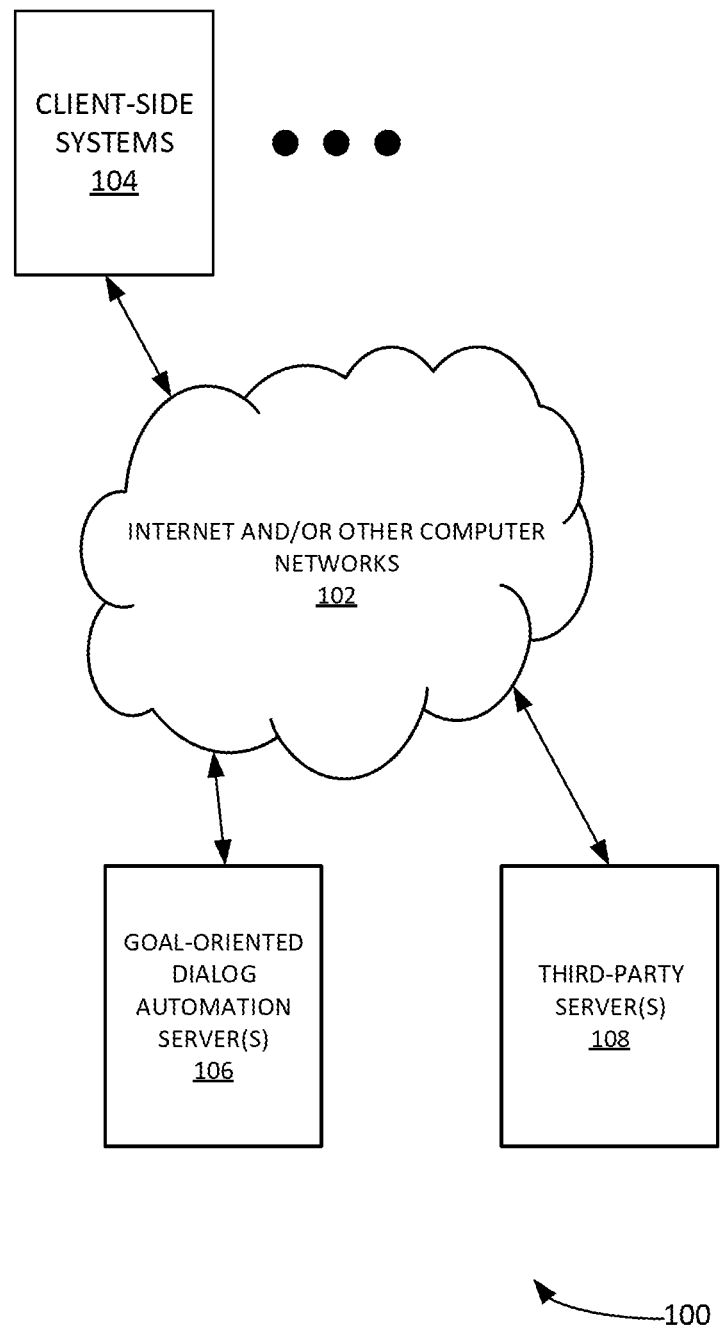
FIG. 1 illustrates an example a goal-oriented dialog automation system, according to some embodiments.

The Figures described above are a representative set and are not an exhaustive with respect to embodying the invention.

DESCRIPTION

Disclosed are a system, method, and article of manufacture for mixed-initiative dialog automation with goal orientation. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to 'one embodiment,' 'an embodiment,' 'one example,' or similar language means that a particular feature, structure, or characteristic described in connection with the embodiment is included in at least one embodiment of the present invention. Thus, appearances of the phrases 'in one embodiment,' 'in an embodiment,' and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

Example definitions for some embodiments are now provided.

Chatbot is a computer program or an artificial intelligence which conducts a conversation via auditory or textual methods.

Directed acyclic graph is a finite directed graph with no directed cycles. It can include a finite number of vertices and edges. Each edge can be directed from one vertex to another, such that there is no way to start at any vertex v and follow a consistently-directed sequence of edges that eventually loops back to v again. A directed acyclic graph can be a directed graph that has a topological ordering, a sequence of the vertices such that every edge is directed from earlier to later in the sequence.

Long short-term memory (LSTM) units (or blocks) are a building unit for layers of a recurrent neural network (RNN). An RNN composed of LSTM units can be an LSTM network. A common LSTM unit is composed of a cell, an input gate, an output gate and a forget gate. The cell is responsible for remembering values over arbitrary time intervals.

Machine learning can include the construction and study of systems that can learn from data. Example machine learning techniques that can be used herein include, inter alias decision tree learning, association rule learning, artificial neural networks, inductive logic programming, support vector machines, clustering, Bayesian networks, reinforcement learning, representation learning, similarity and metric learning, and/or sparse dictionary learning.

Semantic frame can be a collection of facts that specify characteristic features, attributes, and functions of a denotatum, and its characteristic interactions with things necessarily or typically associated with it. The semantic frame captures specific pieces of information that are relevant to summarizing and driving a goal-oriented conversation.

Tokenization can include the process of breaking a stream of text up into words, phrases, symbols, or other meaningful elements called tokens which represent the basic unit processed by the NLP system. The list of tokens becomes input for further processing such as parsing or text mining.

Example Computer Architecture and Systems

FIG. 1 illustrates an example a goal-oriented dialog automation system 100, according to some embodiments. Users can use client-side systems (e.g. mobile devices, telephones, personal computers, etc.) to access the services of goal-oriented dialog servers 106 via input messages. Input messages can include, inter alia: voice messages, text messages, etc.

System 100 can include various computer and/or cellular data networks 102. Computer and/or cellular data networks 102 can include the Internet, cellular data networks, local area networks, enterprise networks, etc. Networks 102 can be used to communicate messages and/or other information from the various entities of system 100.

Goal-oriented dialog servers 106 can implement the various process of FIG. 4-13 Goal-oriented dialog servers 106 can obtain an input message at time t, mt, which is sent through a hierarchical sequence labelling based entity tagger (e.g. see entity tagging and semantic frame extraction embodiments and steps infra). The labelled message along with the tagged message context is then used by the semantic frame extractor (e.g. see entity tagging and semantic frame extraction embodiments and steps infra) which generates a semantic frame, Ft (see semantic frame implementations infra). The semantic frame can be a complete representation of the conversation till time t and, holds information about the specific entities being spoken about. Accordingly, the entities can be mapped to a standard name. This mapping can be implemented in an entity interpretation phase (see entity interpretation processes infra). The interpreted request can then be sent to the database to check whether it can be satisfied (e.g. to check if the business' schedule has availability for the requested services). The labelled message and tagged message context can also be sent to a response retrieval engine which ranks a universe of response templates. A response template can be/include a canonical response. The canonical response can capture the semantic nature of the sentence, while being completely agnostic to the values of the actual entities. For example, one potential template response could look like ⟨STAFF⟩ is available at ⟨TIME-HOURMIN⟩ at ⟨LOCATION⟩. This ranked list of candidate templates can then be passed to a candidate extractor whose task is to ensure that any responses going out of it are semantically consistent with the semantic frame and the availability returned by a relevant database (DB) if this is not in violation of any business rules. Examples of business rules can include, inter alia: requirement to provide a two-hour notice to book a massage; cannot cancel appointments with John with less than twenty-four hours of notice; etc. Based on the confidence scores of the entries in this filtered list of responses, the message can either directly send to the user, or is forwarded to an artificial intelligence (AI) trainer for manual verification (e.g. which provides relevance feedback and supervised data to retrain the retrieval engine, etc.). In addition to responding to messages sent by the user, the system allows for event-based triggers. These triggers may be rule based (for example, the workflow may require reminders to be sent to the user periodically) or based on the output of a classifier (e.g. in case a caller is becoming irate it might be prudent to pause the automated responses and forward the request to the concerned people). Each of these triggers can independently send the relevant notification to the smart notifier. The message can then be routed to either a specified user or a member of the business/staff. This framework can run in parallel with the response retrieval framework to provide a cohesive, end-to-end goal-oriented dialogue automation system. The subsequent sections capture details of the components described above along with a description of the techniques used.

Third-party servers 108 can be used to obtain various additional services. These services can include, inter alia: ranking systems, search-engines, language interpretation, natural language processing services, database management services, etc.

Figure 2:
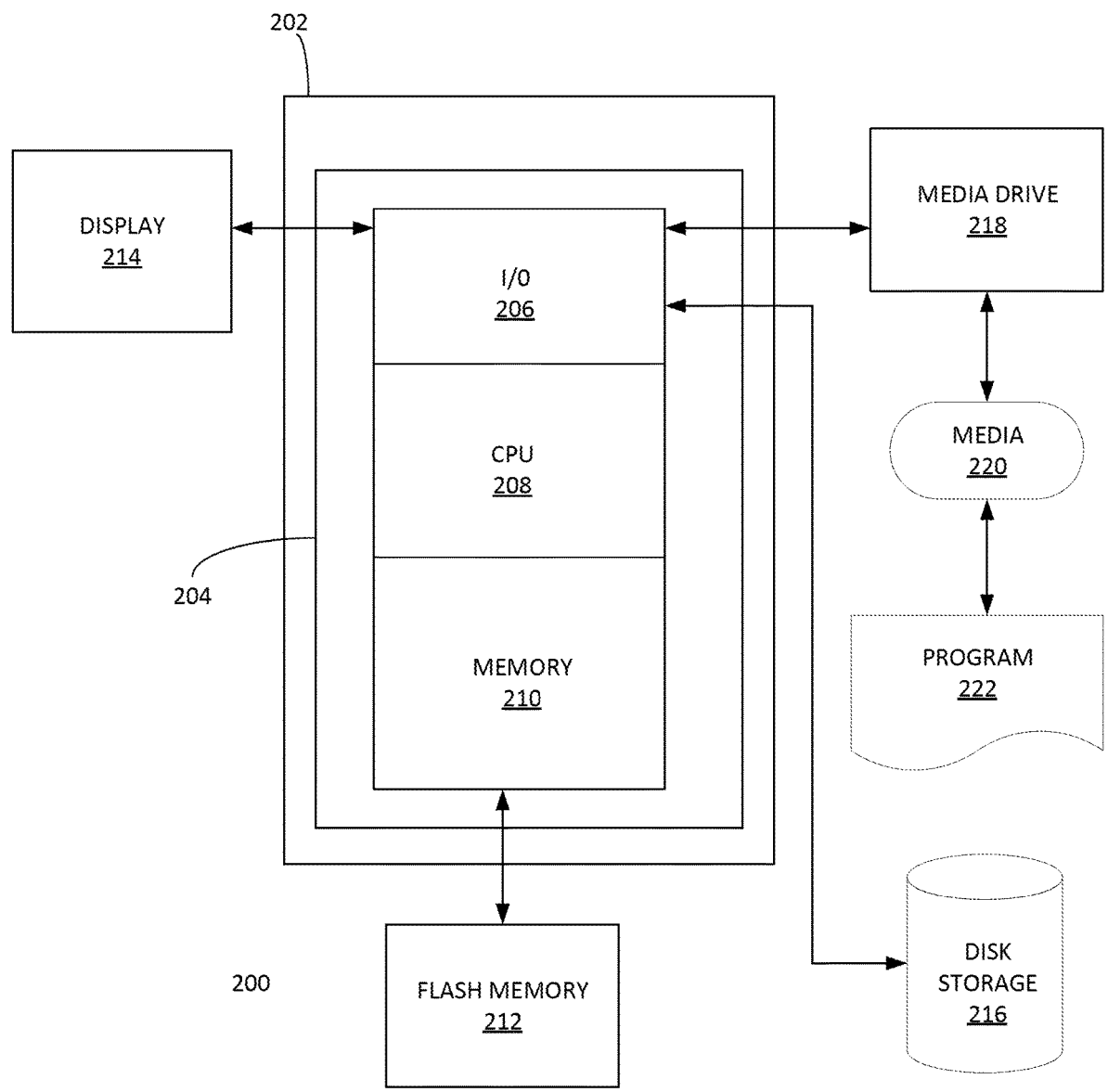
FIG. 2 depicts an exemplary computing system that can be configured to perform any one of the processes provided herein.

FIG. 2 depicts an exemplary computing system 200 that can be configured to perform any one of the processes provided herein. In this context, computing system 200 may include, for example, a processor, memory, storage, and I/O devices (e.g., monitor, keyboard, disk drive, Internet connection, etc.). However, computing system 200 may include circuitry or other specialized hardware for carrying out some or all aspects of the processes. In some operational settings, computing system 200 may be configured as a system that includes one or more units, each of which is configured to carry out some aspects of the processes either in software, hardware, or some combination thereof.

FIG. 2 depicts computing system 200 with a number of components that may be used to perform any of the processes described herein. The main system 202 includes a motherboard 204 having an I/O section 206, one or more central processing units (CPU) 208, and a memory section 210, which may have a flash memory card 212 related to it. The I/O section 206 can be connected to a display 214, a keyboard and/or other user input (not shown), a disk storage unit 216, and a media drive unit 218. The media drive unit 218 can read/write a computer-readable medium 220, which can contain programs 222 and/or data. Computing system 200 can include a web browser. Moreover, it is noted that computing system 200 can be configured to include additional systems in order to fulfill various functionalities. Computing system 200 can communicate with other computing devices based on various computer communication protocols such a Wi-Fi, Bluetooth® (and/or other standards for exchanging data over short distances includes those using short-wavelength radio transmissions), USB, Ethernet, cellular, an ultrasonic local area communication protocol, etc.

Figure 3:
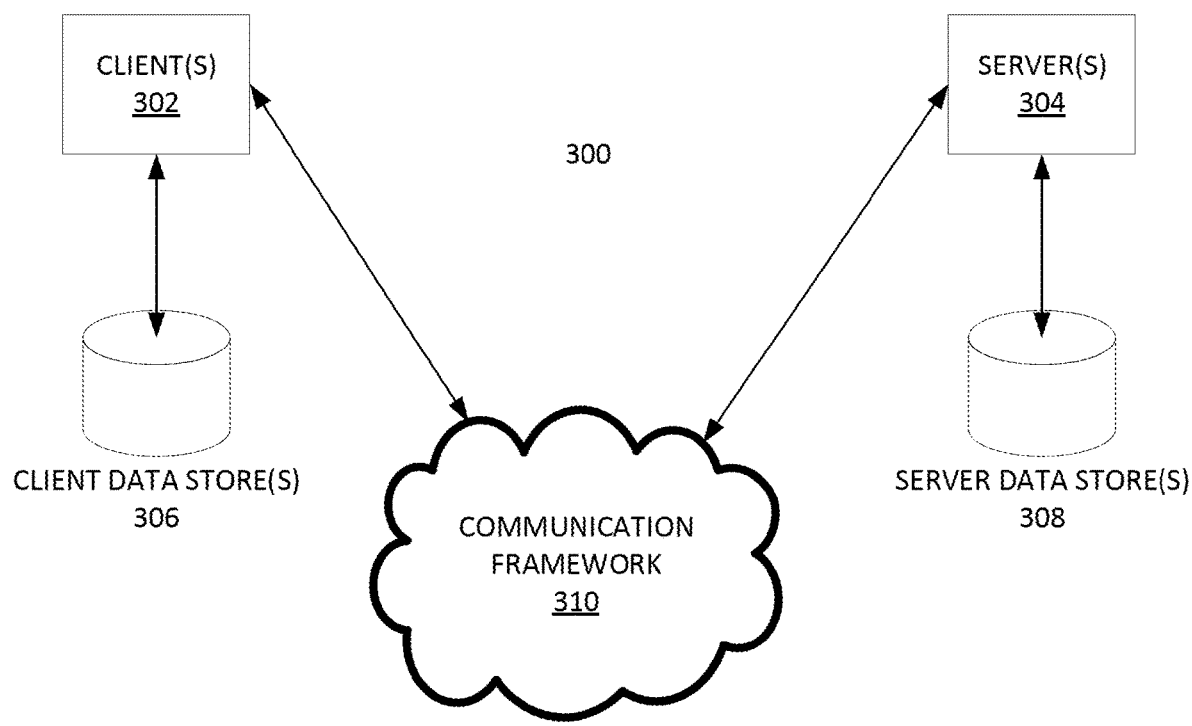
FIG. 3 is a block diagram of a sample computing environment that can be utilized to implement various embodiments.

FIG. 3 is a block diagram of a sample computing environment 300 that can be utilized to implement various embodiments. The system 300 further illustrates a system that includes one or more client(s) 302. The client(s) 302 can be hardware and/or software (e.g., threads, processes, computing devices). The system 300 also includes one or more server(s) 304. The server(s) 304 can also be hardware and/or software (e.g., threads, processes, computing devices). One possible communication between a client 302 and a server 304 may be in the form of a data packet adapted to be transmitted between two or more computer processes. The system 300 includes a communication framework 310 that can be employed to facilitate communications between the client(s) 302 and the server(s) 304. The client(s) 302 are connected to one or more client data store(s) 306 that can be employed to store information local to the client(s) 302. Similarly, the server(s) 304 are connected to one or more server data store(s) 308 that can be employed to store information local to the server(s) 304. In some embodiments, system 300 can instead be a collection of remote computing services constituting a cloud-computing platform.

Exemplary Methods

Figure 4:
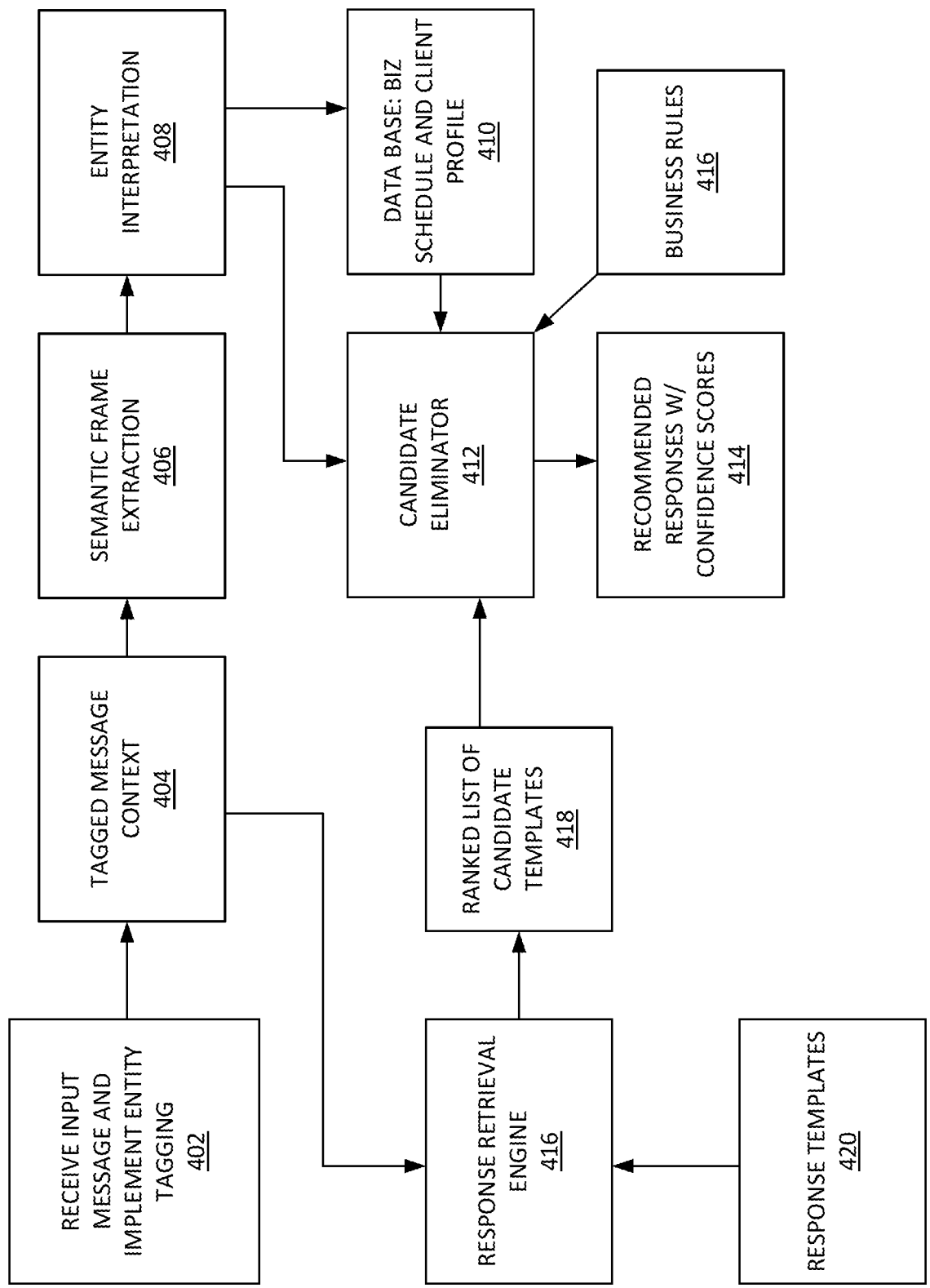
FIG. 4 illustrates an example response retrieval process for implementing a conversational agent, according to some embodiments.

FIG. 4 illustrates an example response retrieval process 400 for implementing a conversational agent, according to some embodiments. Example conversational agents can be based on response retrieval process 400. In step 402, framework 400 can receive input message and implement entity tagging. In step 404, process 400 tags the message context. In step 406, process 400 can implement semantic frame extraction. In step 408, process 400 can implement entity interpretation. In step 410, process 400 can access a database to determine a business schedule and client profile. In step 412, process 400 can implement a candidate eliminator. Step 412 can incorporate use of business rules 416. In step 414, based on the output of step 412, process 400 can recommended responses with confidence scores 414.

Process 400 can also implement a response retrieval engine 416. Response retrieval engine 416 can obtain response templates 418. Response retrieval engine 416 can obtain a tagged message context. Process 400 can also implement a response retrieval engine 416. Response retrieval engine 416 can generate a ranked list of candidate templates 418 to candidate eliminator step 412.

Figure 5:
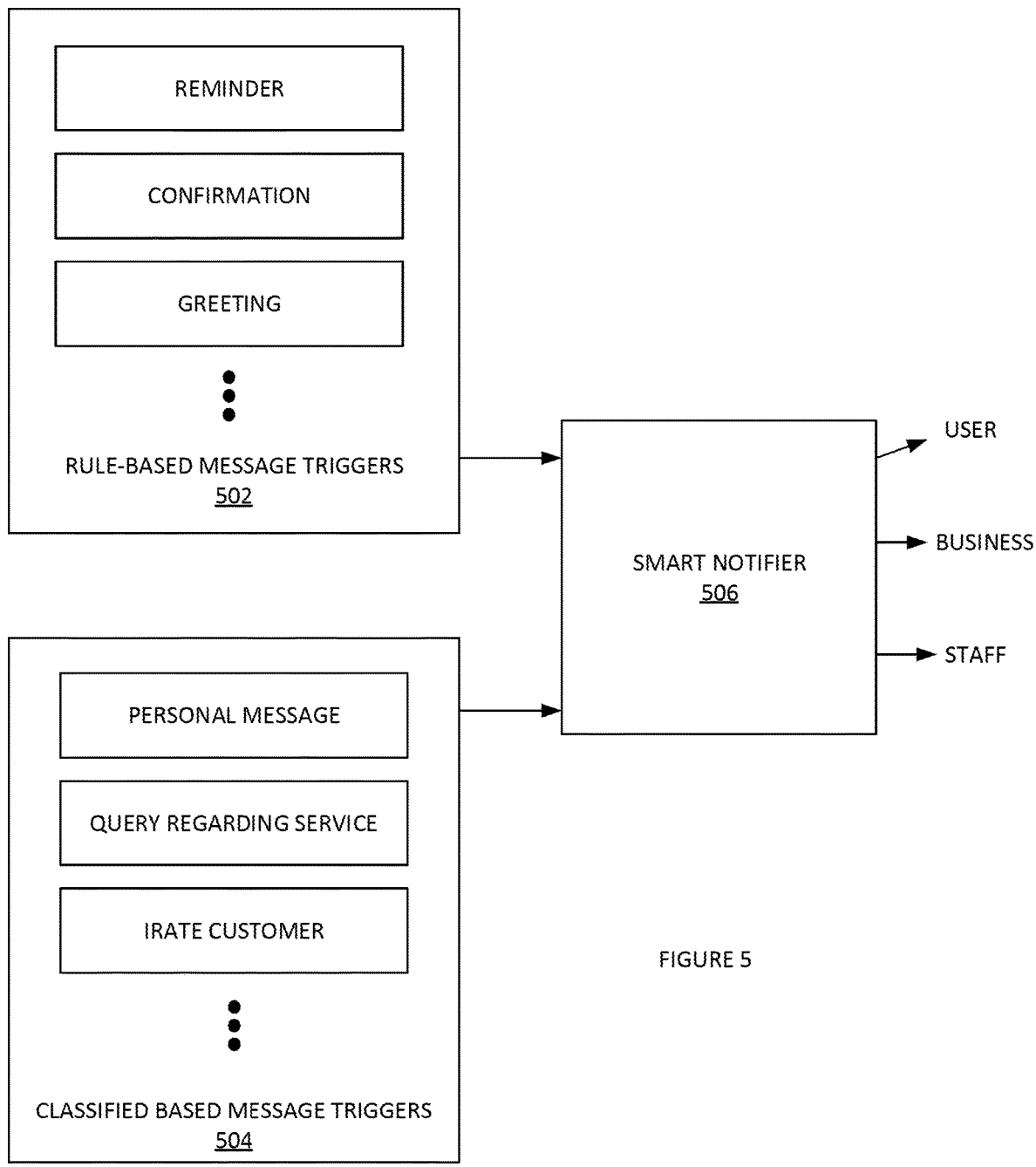
FIG. 5 illustrates an example smart notifier framework, according to some embodiments.

FIG. 5 illustrates an example smart notifier framework 500, according to some embodiments. Smart notifier framework 500 can run in parallel to the response retrieval framework of process 400. There can be two avenues by which an event may be triggered: rule-based message triggers 502 and/or classifier-based message triggers 504. Rule based triggers 502 can be independent of the state of a conversation. An event 'e' can be fired based upon the business information available and the client's profile (e.g. as provided in process 400 supra). For example, the event 'e' can be an event to remind the user to add their credit card details. 'e' can be triggered if the business requires a user's credit card to be on file, and each reminder event will check the user's profile to validate whether the details have been provided. Classifier based triggers 504 can be classifiers that depend upon an immediate dialogue text. There can be individual classifiers for each potential trigger. These classifiers can take as input the message 'mt' and output whether or not an event needs to be triggered and if so, to whom. These events can then trigger messages to the appropriate person (e.g. based upon the content of the event).

FIG. 6 illustrates an example schema for a semantic frame 600, according to some embodiments. A semantic frame can be used to express the structured information in a dialog session. In one example, the semantic frame for a dialogue 'Dt' can be denoted by 'Ft'. The semantic frame is updated with each new message that is sent and/or received in a session. A semantic frame can be a simple collection of slots along with an associated intent. Each slot can hold the value of an entity (e.g. a name, a phone number, date, etc.) and/or it can in-turn reference another frame (e.g. a client's profile, a booking request, etc.). In a fully instantiated semantic frame, its slots recursively resolve to a collection of entity values. FIG. 6 illustrates an example schema. While this example lists frames corresponding to the book, modify, cancel or info intents, the structure can be extended in other ways to address multiple intents (e.g. identification of spam calls, calls requiring immediate business attention, etc.). The semantic frame Ft for a dialog Dt can be visualized as a Directed Acyclic Graph, where each node is a frame (or sub-frame) and its child nodes are the corresponding slots in that frame. When a slot contains an entity value, it can become a leaf node. In another example, the graph can become a deeper by one more level to represent another sub-frame. Nodes in the graph can be labelled by the type of the frame (or slot) that it represents. When there are multiple nodes of the same type and at the same level, they are numbered in order to assign each of them a unique label. Edges in the graph can be labelled with an intent, that qualifies the relationship between the nodes that it connects.

FIGS. 7-10 illustrate examples of entity tagging and semantic frame extraction, according to some embodiments. Structure (e.g. semantic frames) from a conversation dialog can reduce to labelling the sequence of text tokens that constitute it. Any set of one or more tokens in the dialog (e.g. contiguous or otherwise, within a single utterance or across multiple utterances) can be assigned a label. The tokens in a dialog that constitute a frame (and/or sub-frame) are assigned the label obtained by the concatenation of the frame-type (or slot-type) and its associated intent (if one exists). Hierarchical sequence labelling can be used to infer frames from conversational dialog. At the most granular level, the tokens can be tagged as belonging to one of the leaf nodes of the graph along with their corresponding intents.

More specifically, FIG. 7 illustrates an example tagging of an example sentence:

m1: 'Is George free for a color today? Oh and my daughter would like a trim'.

Figure 10:
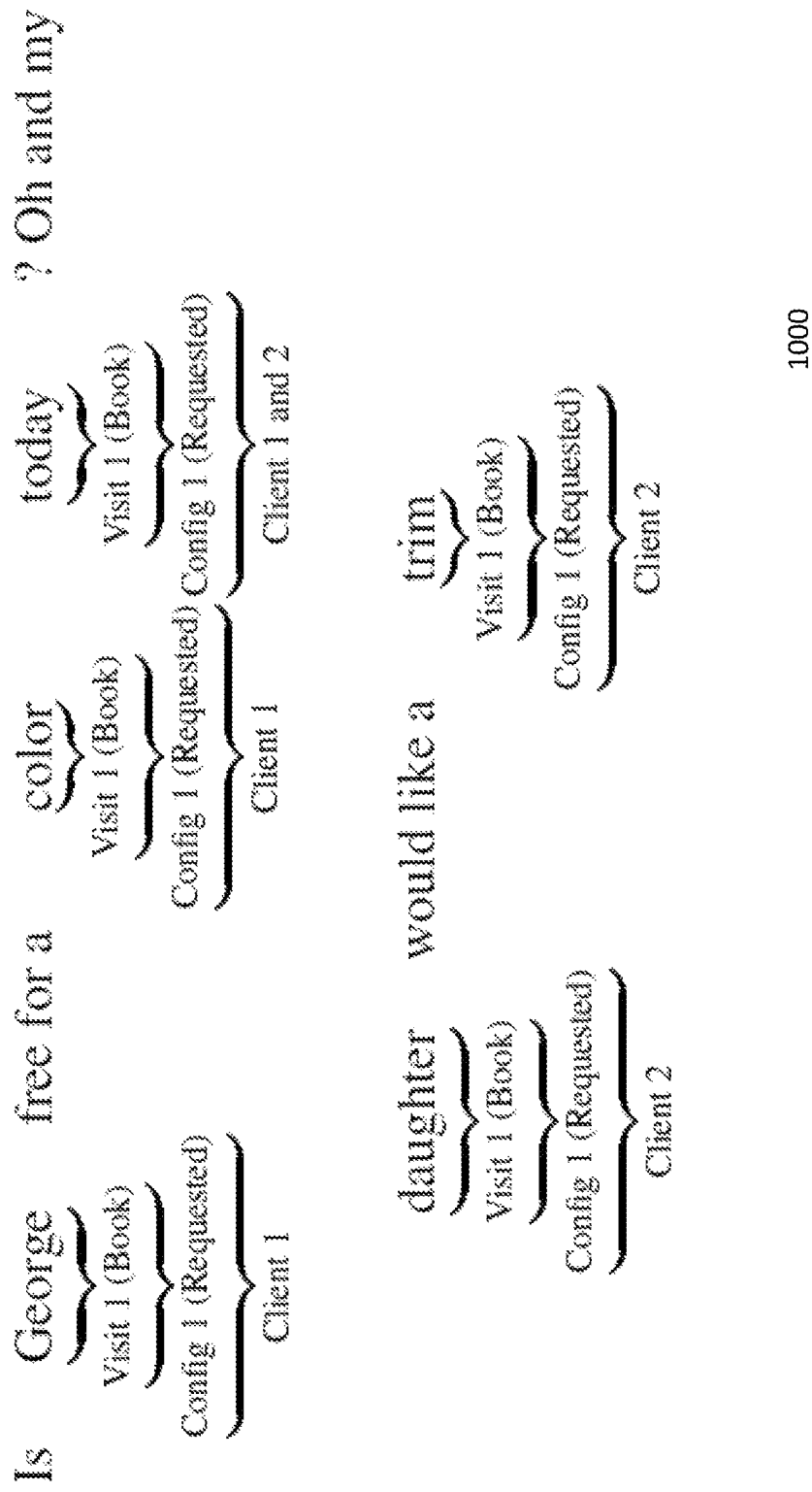

The process shown in FIG. 7 provides a set of entity labels. To extract actionable information from the conversation, additional information about the association between these entities can be obtained. For example, it can be determined which person required the color service and who needed the haircut. In order to capture this multiplicity of configurations, a multi-pass hierarchical sequence framework can be generated. The sentence of FIG. 7 can be first passed through the multi-pass hierarchical sequence framework in order to tag the entities at the highest level in the graphical representation of the semantic frame to generate the content of FIG. 8. A second pass over the sentence can reveal no new visits in the conversation and would thus proceed to the next hierarchical level in the graph—configurations, as provided in FIG. 9. The next pass can once again reveal no new configurations, and the process can proceed to the next level—client. As shown in FIG. 10, labels can be obtained for both the first and the second pass since there are two clients being spoken of. Thus, each pass captures the key information in a dynamically evolving hierarchy of semantic frames. While there is a regularity to the structure of the evolving hierarchy, the size and shape of the directed acyclic graphs changes dynamically as the conversation proceeds. It is noted that if no labels are assigned for a particular pass, the process proceeds to a next level in the hierarchy of the multi-pass hierarchical sequence framework until the leaf nodes are reached.

FIG. 11 illustrates an example table 700 of a process of implementing a multi-pass hierarchical sequence framework, according to some embodiments. Table 700 illustrates the sequential nature of the multi-pass hierarchical sequence framework process.

Figure 12:
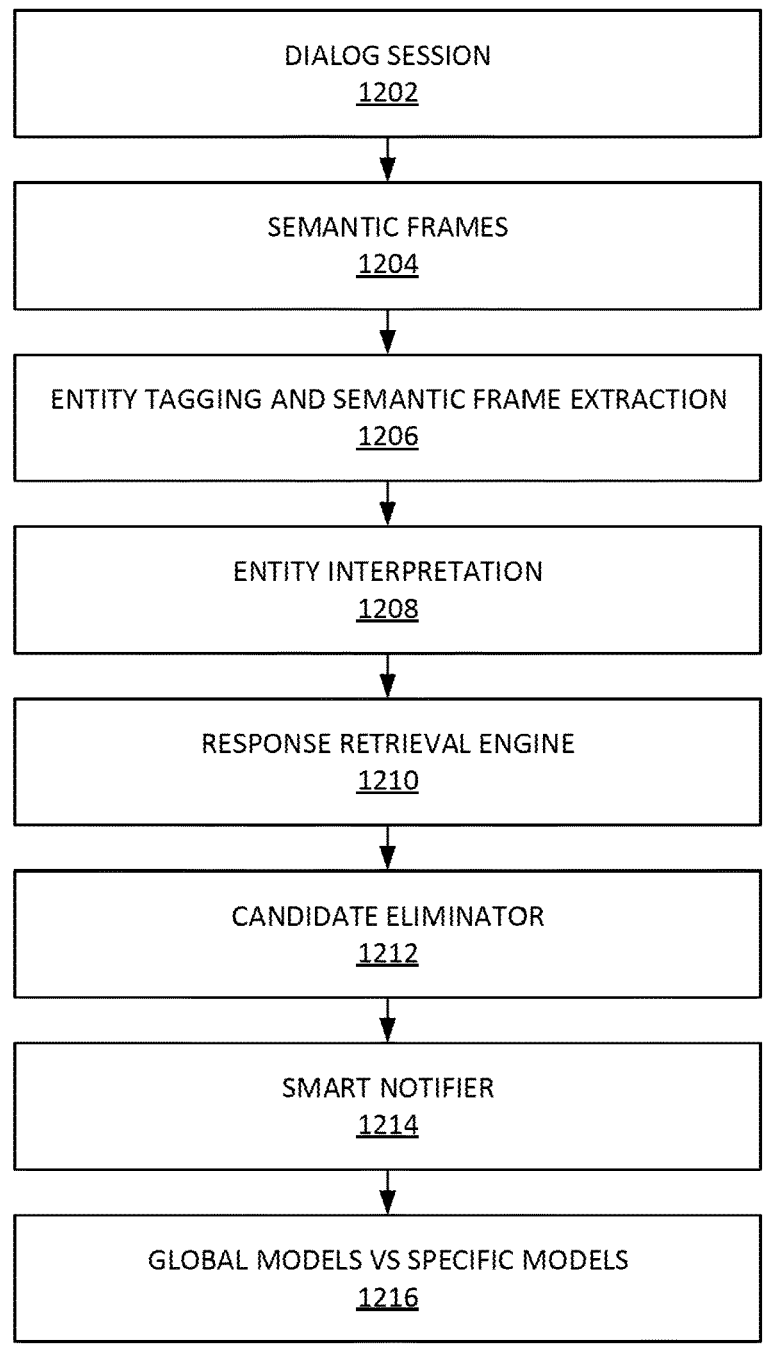
FIG. 12 illustrates an example process for implementing goal-oriented dialog automation, according to some embodiments.

FIG. 12 illustrates an example process for implementing goal-oriented dialog automation, according to some embodiments. In step 1202, process 1200 can implement a dialog session. The dialog session can comprise a set of utterances or messages. The dialog session can be in a computer-readable format and obtained from voice message, text message, electronic mail content, etc.

In step 1204, process 1200 can implement semantic frames. Additional information for implementing semantic frames is provided herein.

In step 1206, process 1200 can implement entity tagging and semantic frame extraction. Step 1206 can provide a set of tokens in a dialog that constitute a frame (or sub-frame) which are assigned the label obtained by the concatenation of the frame-type (or slot-type) and its associated intent (if one exists). Hierarchical sequence labelling can be used to infer frames from conversation/message(s).

In step 1208, process 1200 implements entity interpretation. During frame inference, one or more tokens may be assigned to a particular slot as its value. For example, a pair of successive tokens, 'men's haircut', may be inferred as a 'requested service'. In order to interpret the request, the slot value can be mapped into appropriate entries in the database. This mapping can be easy if there is an exact match of the slot value with the corresponding service(s) in the database. However, in some examples, this may not be case. The slot may contain misspelled words, acronyms, common (and/or uncommon) alternative ways to reference a service, etc. In some examples, a single-token slot value can map to multiple database (DB) entries, and at other times, multiple-token slot values may map to a single DB entry. A learning model can be applied. For example, let v denote the slot-value that needs to be mapped. Let C denote a list of candidate DB entries that v can be mapped into. For each $c \in C$, process 1200 can construct a feature vector $f(v; c)$ that measures various aspects of v and c individually, as well as the extent of match between v and c. Process 1200 can then learn a ranker that takes the set $\{f(v; c): c \in C\}$ as inputs and outputs the most relevant entries in the database that v can map into, along with their corresponding confidence scores. This sorted list can then be used to interpret the request for further processing.

In step 1210, process 1200 can implement a response retrieval engine. For example, let $M=\{m1, m2, \ldots, m_{|R|}\}$ denote the universe of message templates from which a response must be chosen. Process 1200 can implement a dialog session 'Dt', with its most recent utterance 'ut'. The response generator takes the utterance 'ut' and the broader context Dt as input and generates a response ut+1. Process 1200 can implement a retrieval framework for the response generator that computes a rank-score $\xi(D_t, m_i) \in \mathbb{R}$ for every $m_i \in \mathcal{M}$. The rank score is computed using an LSTM-based encoder-decoder architecture with a hierarchical attention mechanism.

The retrieval framework returns a rank-score sorted list of top-k responses to the response generator. Training the ranker is posed as a supervised learning problem. The more frequently a given message $m \in \mathcal{M}$ is used for an input context of Dt or similar, the higher the rank-score can be for that message. In this way, process 1200 can provide a data-driven framework to learn the best response for a given context that uses relevance feedback and that scales with more and more real conversational data. Situations arise which render a single global response retrieval engine across all businesses restrictive and process 1200 can implement step 1216 accordingly (see infra).

In step 1212, process 1200 can implement a candidate eliminator. An example candidate eliminator process is now discussed. For example, $M=\{m_{t_1}, m_{t_2}, \ldots, m_{t_k}\}$ can denote the rank-sorted list of top-k response-templates returned by the retrieval engine for the input context Dt. Not all response-templates may be valid for use in the current context. For example, $mi1$ may be meant to recommend availabilities, but as per the schedule, there may actually be none. The candidate eliminator runs down this list and returns only those responses which are valid given the current state of the semantic frame and database.

In step 1214, process 1200 can implement a smart notifier. As noted, this portion of the pipeline can run in parallel to the response retrieval framework described herein. There are two avenues by which an event may be triggered.

In a first example, rule-based triggers can be implemented. In a second example, classifier-based triggers can be implemented. These classifiers can depend upon the immediate dialogue text. There can be individual classifiers for each potential trigger and these classifiers take as input the full session context Dt and any new incoming message and output whether or not an event needs to be triggered and if so, to whom. These events then trigger messages to the appropriate person (e.g. based upon the content of the event).

In step 1216, process 1200 can implement global models and/or specific models. For example, a business may have certain response templates which occur frequently in conversation but are not applicable to other businesses. Having a single universe of response templates across businesses does not cater to these scenarios and stifles the organic development of the system. Two bags of response templates can be utilized. One bag of response templates can be a global bag of response templates. Another bag of response templates can be a business specific bag of response templates. As noted, on receipt of a user utterance 'ut' and a dialogue context 'Dt', then each message mi in the global response templates can be given a score global $\xi^{global}(D_t, m_t) \in \mathbb{R}$. Additionally, another model can independently ascribe the business specific templates a score business $\xi^{business}(D_t, m_t) \in \mathbb{R}$. These two scored lists of responses can be sent to the candidate eliminator for filtering.

Figure 13:
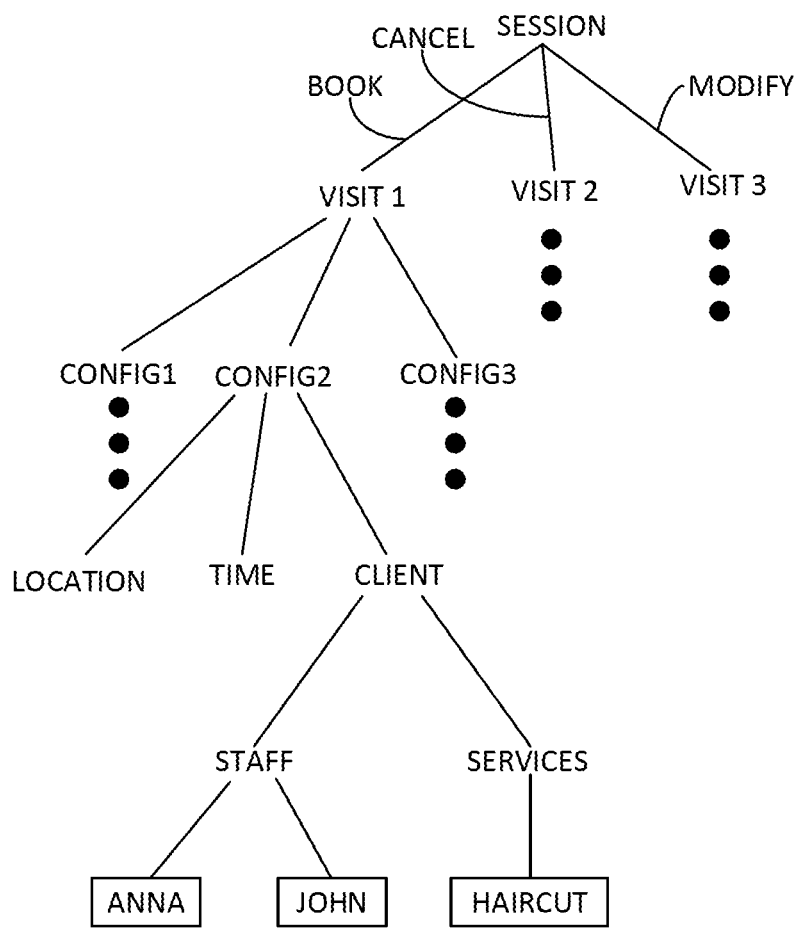
FIG. 13 illustrates an example semantic frame as a directed acyclic graph, according to some embodiments.

FIG. 13 illustrates an example semantic frame example as a directed acyclic graph 1300, according to some embodiments. Directed acyclic graph 1300 is a graphical representation of the semantic frame examples discussed supra. Directed acyclic graph 1300 includes hierarchical levels as shown. Process 1200 tags tokens of the input message as belonging a relevant leaf node(s) of directed acyclic graph 1300 along with their corresponding intents. FIGS. 7-10 illustrate the passing of an input message through the illustrated hierarchical levels and the resulting output.

Figure 14:
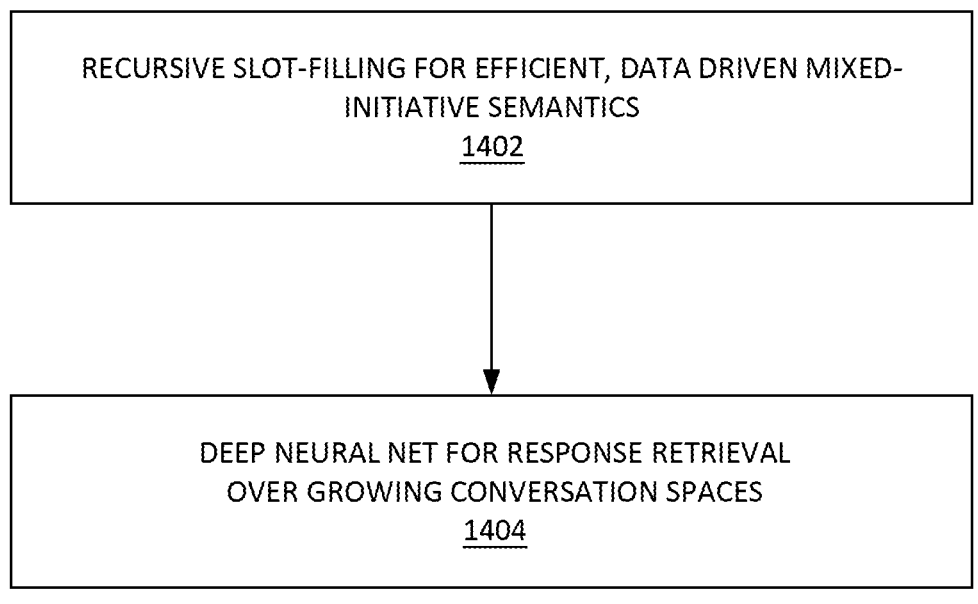
FIG. 14 illustrates an example process for implementing a hybrid neural model for a conversational AI first solution that successfully combines goal-orientation and chat-bots, according to some embodiments.

FIG. 14 illustrates an example process for implementing a hybrid neural model for a conversational AI first solution that successfully combines goal-orientation and chat-bots, according to some embodiments. In step 1402, process 1400 implements a recursive slot-filling for efficient, data driven mixed-initiative semantics. In step 1404, process 1400 implements a deep neural network for response retrieval over growing conversation spaces.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed as new and desired to be protected by Letters Patent of the United States is:

1. A method useful for goal-oriented dialog automation comprising:
receiving an input message;
implementing an entity tagging operation on the input message, wherein the entity tagging operation implements a hierarchical sequence labelling based entity tagger to label and tag the input message;
tagging the message context of the input message to generate a tagged message context;
with a semantic frame extractor, implementing semantic frame extraction from the tagged message context, wherein the semantic frame extractor extracts a semantic frame from a conversation dialog of the input message, wherein the input message has been annotated with labels and tags by the entity tag operation, and wherein the semantic frame extractor implements hierarchical sequence labelling to infer frames from the conversational dialog, and wherein the semantic frame comprises a directed acyclic graph (DAG), and wherein the DAG comprises a set of nodes that recursively resolve to a collection of entity values such that when a node of the DAG contains an entity value, the node becomes a leaf node of the DAG;
implementing an entity interpretation on the extracted frame;
accessing a database to determine a business schedule and a client profile, wherein the business schedule and the client profile are related to the input message;
implementing a retrieval engine, wherein the retrieval engine obtains one or more response templates;
generating a ranked list of candidate templates from the output of the retrieval engine by computing a rank-score score using an Long short-term memory (LSTM)-based encoder-decoder architecture with a hierarchical attention mechanism, wherein the LSTM-based encoder-decoder architecture comprises a set of LSTM units for layers of a recurrent neural network (RNN), wherein the LSTM units are stored in an LSTM network, wherein a LSTM unit is composed of a cell, an input gate, an output gate and a forget gate, and wherein the cell is used to remember a set of values over an arbitrary time intervals;
based on the output of the entity interpretation, the business schedule and the client profile, and the ranked list of candidate templates, implementing a candidate eliminator; and
based on the output of the candidate eliminator, providing a set of recommended responses, wherein each recommend response is associated with a confidence score.

2. The method of claim 1, wherein the input message comprises a voice message.

3. The method of claim 1, wherein the input message comprises a text message.

4. The method of claim 3 further comprising:
passing the ranked list of candidate templates to a candidate extractor, wherein the candidate extractor filters the responses to ensure that the response is semantically consistent with the semantic frame and the availability returned by a relevant database (DB) does not violate the business rules.

5. A computerized system useful for goal-oriented dialog automation, comprising:
at least one processor configured to execute instructions;
a memory containing instructions when executed on the processor, causes the at least one processor to perform operations that:
receive an input message;
implement an entity tagging operation on the input message, wherein the entity tagging operation implements a hierarchical sequence labelling based entity tagger to label and tag the input message;
tag the message context of the input message to generate a tagged message context;
with a semantic frame extractor, implementing semantic frame extraction from the tagged message context, wherein the semantic frame extractor extracts a semantic frame from a conversation dialog of the input message, wherein the input message has been annotated with labels and tags by the entity tag operation, and wherein the semantic frame extractor implements hierarchical sequence labelling to infer frames from the conversational dialog, and wherein the semantic frame comprises a directed acyclic graph (DAG), and wherein the DAG comprises a set of nodes that recursively resolve to a collection of entity values such that when a node of the DAG contains an entity value, the node becomes a leaf node of the DAG;

implement an entity interpretation on the extracted frame;

access a database to determine a business schedule and a client profile, wherein the business schedule and the client profile are related to the input message;

implement a retrieval engine, wherein the retrieval engine obtains one or more response templates;

generate a ranked list of candidate templates from the output of the retrieval engine by computing a rank-score score using an Long short-term memory (LSTM)-based encoder-decoder architecture with a hierarchical attention mechanism, wherein the LSTM-based encoder-decoder architecture comprises a set of LSTM units for layers of a recurrent neural network (RNN), wherein the LSTM units are stored in an LSTM network, wherein a LSTM unit is composed of a cell, an input gate, an output gate and a forget gate, and wherein the cell is used to remember a set of values over an arbitrary time intervals;

based on the output of the entity interpretation, the business schedule and the client profile, and the ranked list of candidate templates, implement a candidate eliminator; and based on the output of the candidate eliminator, provide a set of recommended responses, wherein each recommend response is associated with a confidence score.

6. The computerized system of claim 5, wherein the input message comprises a voice message.

7. The computerized system of claim 5, wherein the input message comprises a text message.

* * * * *